(No Model.)
C. A. TREDWELL.
GEAR WHEEL.
No. 594,219.  Patented Nov. 23, 1897.
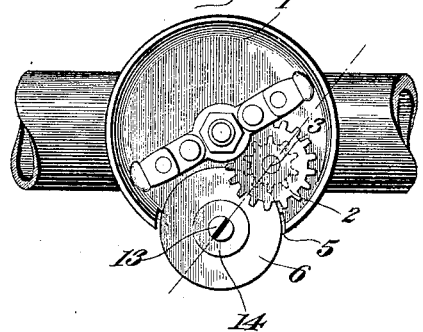
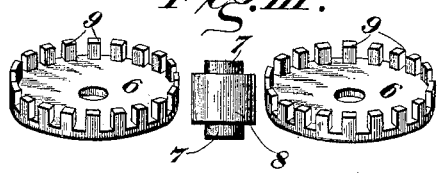
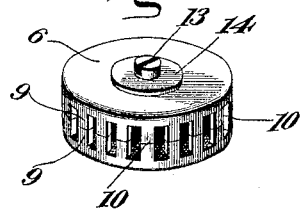
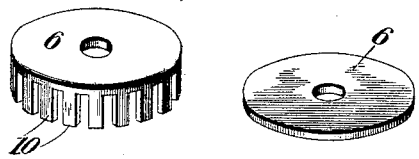
Witnesses
M. E. Fowler
S. M. Acker
Inventor
Charles A. Tredwell
By Joseph L. Atkin
Attorney
THE NORRIS PETERS CO., PHOTO-LITHO., WASHINGTON, D. C.

UNITED STATES PATENT OFFICE.

CHARLES A. TREDWELL, OF BRISTOL, CONNECTICUT, ASSIGNOR, BY MESNE ASSIGNMENTS, TO THE P. & F. CORBIN, OF NEW BRITAIN, CONNECTICUT.

GEAR-WHEEL.

SPECIFICATION forming part of Letters Patent No. 594,219, dated November 23, 1897.

Application filed September 12, 1896. Serial No. 605,566. (No model.) Patented in England September 28, 1896, No. 21,454.

*To all whom it may concern:*

Be it known that I, CHARLES A. TREDWELL, a citizen of the United States, residing at Bristol, in the county of Hartford, State of Connecticut, have invented certain new and useful Improvements in Gear-Wheels, (for which I have obtained a patent in Great Britain, No. 21,454, bearing date of September 28, 1896,) of which the following is a specification, reference being had to the accompanying drawings.

The object of my invention is to produce an improved gear-wheel which, being especially designed for use in bicycle-bells, is adapted to impart rotary movement to the mechanism thereof and at the same time to present to the thumb or finger of the operator a smooth-finished, effectual, and mild operating-surface.

In the accompanying drawings, Figure I is a top plan view of my wheel incorporated with a species of bicycle-bell mechanism. Fig. II is a section of the same taken through the stud-pin upon which the gear revolves and that of the intermeshing gear. Fig. III illustrates in group the component parts of the preferred form of my gear. Fig. IV is a perspective view of the same united. Fig. V illustrates in group the component parts of a modified form of my gear.

Referring to the figures on the drawings, 1 indicates the base of a bicycle-bell, which is illustrated merely by way of example of mechanism with which my gear is especially adapted to be used.

2 is an intermediate gear incorporated in bicycle-bell mechanism and which is pivoted upon a pin 3, projecting from the base.

4 indicates a stud-pin located in proximity to the usual aperture 5, which in bells of this class are designed to accommodate an operating-gear. It is in such a gear that my invention resides.

The gear consists of a pair of plates 6, each provided with concentric apertures adapted to receive the reduced ends 7 of a bushing 8. One or both of the plates is provided with a series of teeth 9, which are formed in the plate and are afterward struck up at right angles to the plate, so as to resemble somewhat a crown-gear. The teeth of the two plates correspond and when united upon the bushing fit opposite to each other. When fastened together, they constitute in effect a kind of cage-gear, each pair of abutting teeth in the opposite plates constituting a cog-pin 10.

In practice I prefer, as above stated, to form teeth in each of the plates and to strike up the toothed edge of each of the plates by the use of dies or other suitable mechanism. After the plates are formed they are placed in position upon the bushing and the parts are firmly united, as by brazing or by forced enlargement of ends of bushing.

The important feature of my completed gear is that each of the cog-pins is perfectly flush with the edge of the plate, so that while it affords a positive coöperation with an intermeshing gear it presents a comparatively smooth surface to the thumb or finger of an operator, affording just enough friction to drive it freely without being severe in its action against the surface of the hand which drives it.

Although I prefer to make my wheel in two corresponding parts and to form the teeth which, when united, constitute the cog-pins equally upon both of the side plates, yet, as illustrated in Fig. V, it is practicable to form the teeth entirely upon one plate and to fit them against the opposite plate.

My gear as applied to a bicycle-bell is preferably secured to the stud-pin 4 by means of a screw 13, screwing into the end of the pin, and an intermediate washer 14.

What I claim is—

1. A gear consisting of a pair of plates, and cog-pins uniting the same, said pins being formed by teeth struck up substantially as set forth.

2. A gear consisting of a pair of plates provided, respectively, with teeth struck up from their edges, respectively, and united together to form a whole, substantially as and for the purpose specified.

In testimony of all which I have hereunto subscribed my name.

CHARLES A. TREDWELL.

Witnesses:
JENNEY T. HAUGH,
JOHN H. KIRKHAM.